US012649487B2

(12) United States Patent
Arora et al.

(10) Patent No.: US 12,649,487 B2
(45) Date of Patent: Jun. 9, 2026

(54) DRIVING SURFACE COST LANDSCAPE

(71) Applicant: Zoox, Inc., Foster City, CA (US)

(72) Inventors: Akash Arora, San Mateo, CA (US);
Andrew Baker, North Hollywood, CA
(US); Timothy Caldwell, Boulder, CO
(US); Eunsuk Chong, Castro Valley,
CA (US); Rasmus Fonseca, Boulder
Creek, CA (US); Ravi Gogna, San
Jose, CA (US); Jeffrey Loris Irion,
Castro Valley, CA (US); **Dhanushka
Nirmevan Kularatne**, Castro Valley,
CA (US); Yangwei Liu, Newark, CA
(US); Joseph Lorenzetti, Foster City,
CA (US); Mark Jonathon McClelland,
San Francisco, CA (US); Jack Riley,
San Francisco, CA (US); Rick Zhang,
Belmont, CA (US)

(73) Assignee: Zoox, Inc., Foster City, CA (US)

( * ) Notice: Subject to any disclaimer, the term of this
patent is extended or adjusted under 35
U.S.C. 154(b) by 231 days.

(21) Appl. No.: 18/228,426

(22) Filed: Jul. 31, 2023

(65) Prior Publication Data

US 2025/0042429 A1 Feb. 6, 2025

(51) Int. Cl.
*B60W 60/00* (2020.01)

(52) U.S. Cl.
CPC ....... *B60W 60/001* (2020.02); *B60W 2552/05*
(2020.02); *B60W 2556/45* (2020.02)

(58) Field of Classification Search
None
See application file for complete search history.

(56) References Cited

U.S. PATENT DOCUMENTS

| 12,060,060 B1 * | 8/2024 | Costantino | ............ G06F 16/285 |
| 2011/0071753 A1 * | 3/2011 | Chu | ................... G01C 21/3658 |
| | | | 701/533 |
| 2019/0226858 A1 | 7/2019 | Freed | |
| 2021/0094539 A1 | 4/2021 | Beller | |

FOREIGN PATENT DOCUMENTS

JP 2007178358 A 7/2007

OTHER PUBLICATIONS

Search Report and Written Opinion for International Application
No. PCT/US2024/039039, Dated Nov. 5, 2024, 11 pages.

* cited by examiner

*Primary Examiner* — Donald J Wallace
*Assistant Examiner* — Paysun Wu
(74) *Attorney, Agent, or Firm* — Lee & Hayes, P.C.

(57) ABSTRACT

Techniques for generating a driving surface cost landscape
for determining costs for vehicle positions in an environ-
ment are described herein. A planning component within a
vehicle may determine a non-preferred surface associated
with a type of non-preferred area of an environment along a
route of a vehicle, determine a preferred surface associated
with a preferred area of the environment, determine an
adjusted non-preferred surface by removing an overlapping
area of the non-preferred surface that overlaps the preferred
surface and determine a cost associated with a vehicle
position based at least on the preferred surface and the
adjusted non-preferred surface. The planning component
may then determine a control trajectory for the autonomous
vehicle based at least in part on the cost associated with the
vehicle position.

19 Claims, 12 Drawing Sheets

180 ─↘

ADJUSTED NON-
PREFERRED
ONCOMING TRAFFIC
SURFACE 174

ADJUSTED NON-
PREFERRED BIKE
LANE SURFACE 172

170

200

DIRECTION TO
DESTINATION
204

ADJUSTED
NON-PREFERRED
CROSS TRAFFIC
SURFACE 210

VEHICLE
202

ADJUSTED
NON-
PREFERRED
ONCOMING
TRAFFIC
SURFACE
208

PREFERRED
SURFACE 206

300 ⌐

400 ⤵

DETERMINE PREFERRED SURFACES AND ADJUSTED
NON-PREFERRED SURFACES
402

3

DETERMINE LANE MARKER DISTANCE COST FOR
POSITION
406

DETERMINE DISTANCE COST FOR ADJUSTED
NON-PREFERRED SURFACE ASSOCIATED WITH
POSITION 408

DETERMINE OTHER COSTS FOR POSITION
410

DETERMINE COMBINED COST FOR POSITION
412

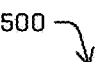

500

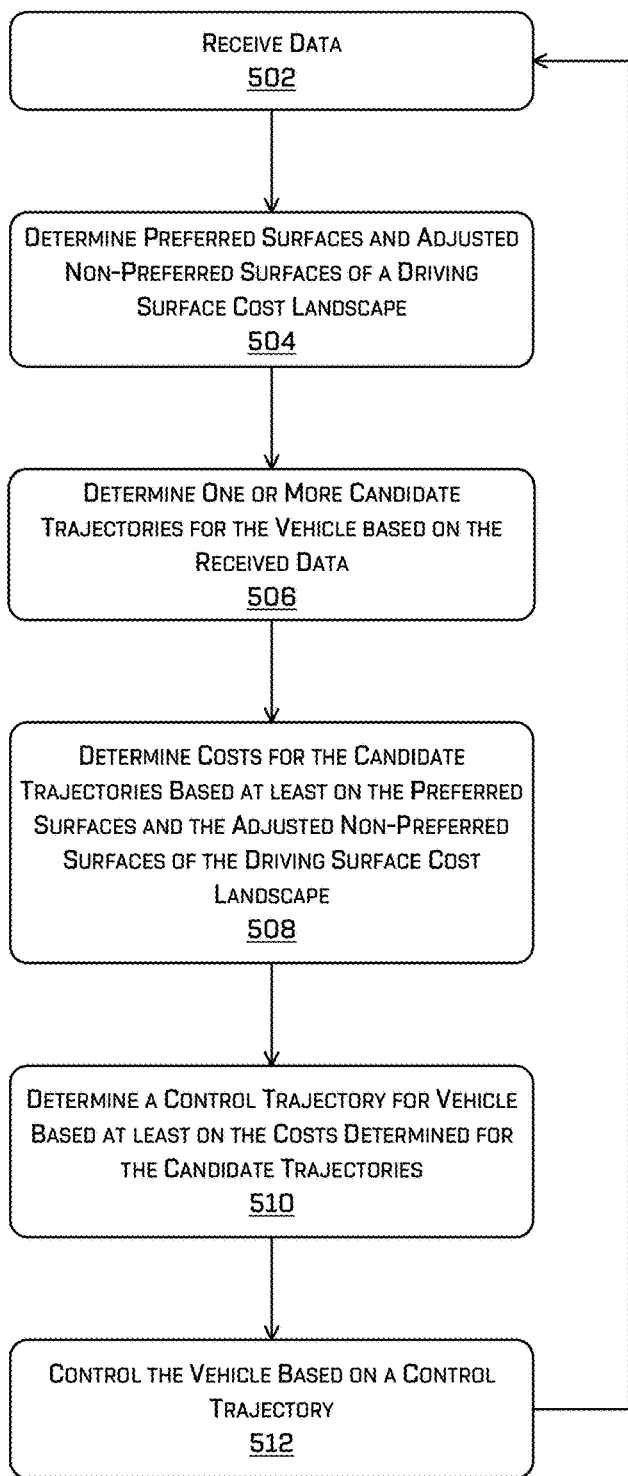

RECEIVE DATA
502

DETERMINE PREFERRED SURFACES AND ADJUSTED
NON-PREFERRED SURFACES OF A DRIVING
SURFACE COST LANDSCAPE
504

DETERMINE ONE OR MORE CANDIDATE
TRAJECTORIES FOR THE VEHICLE BASED ON THE
RECEIVED DATA
506

DETERMINE COSTS FOR THE CANDIDATE
TRAJECTORIES BASED AT LEAST ON THE PREFERRED
SURFACES AND THE ADJUSTED NON-PREFERRED
SURFACES OF THE DRIVING SURFACE COST
LANDSCAPE
508

DETERMINE A CONTROL TRAJECTORY FOR VEHICLE
BASED AT LEAST ON THE COSTS DETERMINED FOR
THE CANDIDATE TRAJECTORIES
510

CONTROL THE VEHICLE BASED ON A CONTROL
TRAJECTORY
512

FIG. 5

DRIVING SURFACE COST LANDSCAPE

BACKGROUND

Vehicles are increasingly supplementing or replacing manual functionality with automatic controls. Autonomous driving functionality, such as trajectory planning and vehicle navigation, may benefit from on-board computing systems capable of making split-second decisions to respond to myriad events and scenarios, including determining trajectories through environments and reactions of the vehicle to dynamic objects and events in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is a flow diagram illustrating an example process for determining a control trajectory from candidate trajectories using a driving surface cost landscape, in accordance with one or more examples of the disclosure.

DETAILED DESCRIPTION

Figure 1A:
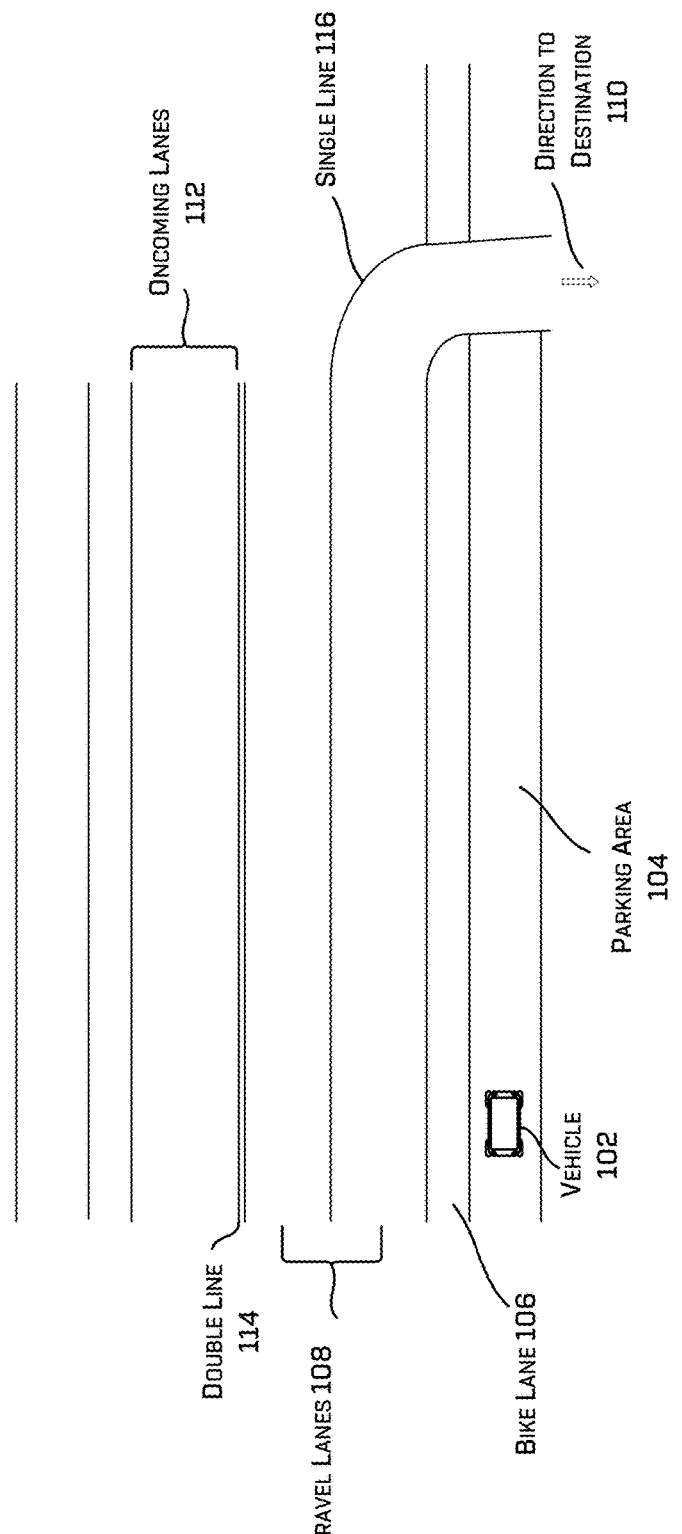
FIG. 1A-1F illustrate an example environment for which an example driving surface cost landscape is generated for a vehicle parked in the environment, in accordance with one or more examples of the disclosure.

This application describes techniques for generating and utilizing a driving surface cost landscape to, for example, determine control trajectories for a vehicle to follow. The driving surface cost landscape may be a framework that allows for determining and organizing costs (e.g., values used to inform driving behavior) that are based on information about a vehicle's route, which may include maps, route references, teleoperator input, parking or other special trajectories and so on.

In some examples, a driving cost landscape may include one or more surfaces which may represent preferred surfaces and non-preferred surfaces. The surfaces may be encoded as heatmaps (e.g., grids of values) or heatmap layers (e.g., multiple such grids with each layer comprising a unique association). The preferred surfaces may be associated with driving lanes along the vehicle's route, special trajectories (e.g., parking trajectories) and/or teleoperator input trajectories or controls. Non-preferred surfaces may be associated with areas in which travel by the vehicle may not be preferred such as driving lanes for oncoming traffic, driving areas associated with cross traffic lanes, bike lanes, parking areas, high occupancy vehicle lanes, center left turn lanes, time restricted driving lanes, areas between separated turning lanes in straight lanes, junction drivable surfaces, bus and/or taxi lanes, and so on. It should be noted that, while travel in the areas associated with non-preferred surfaces may not be preferred generally, the vehicle may travel in those areas in some circumstances such as, for example, overcoming a double parked vehicle. Non-preferred surfaces may differ from non-drivable surfaces or impassable areas which the vehicle may be prohibited from traversing (e.g., sidewalks, buildings, cliffs, etc.)

Non-preferred surfaces may be categorized or typed. Each category or type of non-preferred surface may be represented by a heatmap encoding the areas of the environment or landscape of that type. For example, a heat map for a type of non-preferred surface for oncoming vehicle lanes may cover the lanes and/or areas in which oncoming vehicles may travel and that may be adjacent to the route or a portion of the route the vehicle is traveling to its destination. Similarly, a heat map for a type of non-preferred surface associated with cross traffic areas may cover the lanes and/or areas in which cross traffic may be traveling which may be shared by the vehicle's route or a portion of the vehicle's route. In some examples, the heat map may include values for a plurality of points of the heatmap that represent a distance from a boundary. For example, a heat map for a cross traffic area may include values indicative of how far inside or outside a boundary of a non-preferred cross traffic area the associated location is.

In operation, a component of the vehicle (hereinafter planning component) may determine the heatmaps for the preferred surfaces and non-preferred surfaces. The planning component may then determine adjusted non-preferred surfaces by removing the portions of the non-preferred surfaces that overlap with the preferred surfaces. For example, a teleoperator may input control information for a teleoperator trajectory to allow an autonomous vehicle to enter and traverse oncoming traffic lanes, bike lanes, a median or so on, for example, to navigate around an obstruction. In such a case, the planning component may treat the areas of the non-preferred surfaces that overlap with the preferred surfaces in a similar or the same manner as other areas of the preferred surfaces.

The planning component may then utilize the preferred surfaces and adjusted non-preferred surfaces of the driving surface cost landscape to determine costs for positions in the environment associated with the driving surface cost landscape. For example, the planning component may determine a cost associated with the position and a boundary of the preferred surfaces, one or more costs associated with the position and boundaries of one or more non-preferred surfaces (e.g., each non-preferred surface, a nearest non-preferred surface, etc.), and so on. The planning component may also determine other costs for the position such as a cost associated with the position and lane markers, a cost associated with a driving speed and so on. Based on these costs, the planning component may then determine a combined cost for the position in the environment.

In some instances, the planning component may utilize the driving surface cost landscape and/or the costs determined thereby to determine and output a control trajectory. For example, the vehicle position may be part of a candidate trajectory for the vehicle and the combined cost may be used, at least partly, to determine a cost for the candidate trajectory. In some examples, a planning component may be integrated within a vehicle (such as an autonomous vehicle) and may receive and/or encode various types of data (e.g., vehicle state data, object features, road features, etc.). The planning component can provide the various types of data as input to one or more machine-learning models (hereinafter "ML models"). In some examples, the ML model(s) may be trained to output one or more candidate trajectories for the vehicle to follow. In such cases, the vehicle may determine a control trajectory based on the costs of the one or more candidate trajectories. The vehicle may follow the control trajectory while operating within the environment.

As discussed throughout this disclosure, the techniques described herein may improve vehicle safety and/or driving efficiency by determining improved driving trajectories through the environment by using the driving surface cost landscape when determining a control trajectory for the vehicle to follow. In some examples, the techniques described herein may improve efficiency by precomputing the costs over surfaces (e.g., to enable quick determinations of costs for deviations in a search, reduced latency when performed using parallel computation, etc.).

The techniques described herein can be implemented in a number of ways. Example implementations are provided below with reference to the following figures. Example implementations are discussed below in which the vehicles are implemented as autonomous vehicles. However, the methods, apparatuses, and systems described herein can be applied to fully or partially autonomous vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in aviation or nautical contexts. Additionally, the techniques described herein may be used with real data (e.g., captured using sensor(s)), simulated data (e.g., generated by a simulator), or any combination of the two.

FIGS. 1A-1F illustrate an example environment for which an example driving surface cost landscape is generated for a vehicle parked in the environment. As illustrated in FIG. 1A, the environment 100 includes a vehicle 102 that is parked in a parking area 104. The parking area 104 is adjacent to a bike lane 106 which is in turn adjacent to travel lanes 108 that are along the route of the vehicle 102 in the direction of the destination of the vehicle 102. The environment 100 also includes a set of oncoming lanes 112 that are divided from the travel lanes 108 by double lines 114. The route of the vehicle 102 in the direction of the destination 110 branches from the other lanes at a junction as indicated by the single-line 116. While road lines are illustrated herein for ease of understanding, examples are not limited to implementations in which the lines are present in the real-world environment.

Figure 1B:
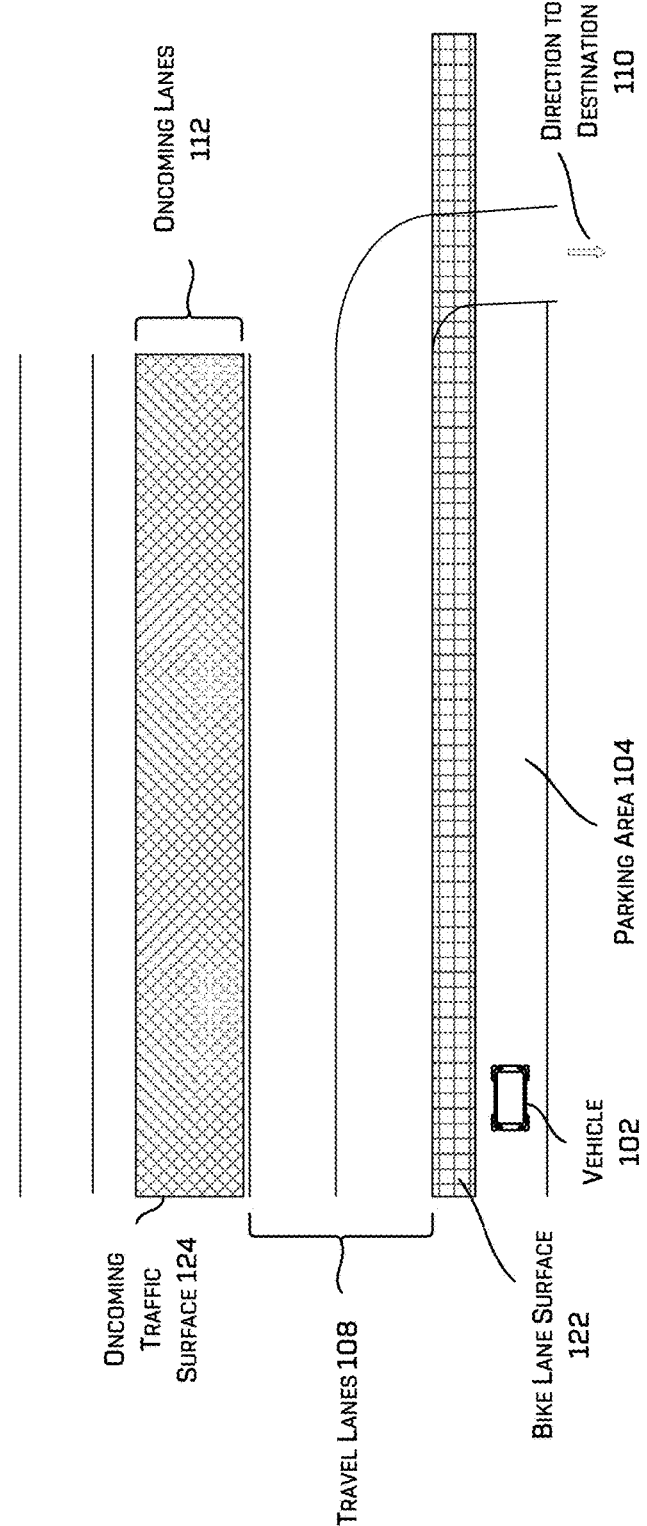

FIG. 1B illustrates an example set 120 of non-preferred surfaces of the example driving surface cost landscape that may be generated for the environment 100. More particularly, the example set 120 of non-preferred surfaces may include a bike lane surface 122 corresponding to the area of the environment of the bike lane 106 and an oncoming surface 124 corresponding to the area of the environment of the oncoming lanes 112. As discussed above, the bike lane surface 122 and the oncoming surface 124 may each be represented as a heatmap or heatmap layer of the driving surface cost landscape.

Figure 1C:
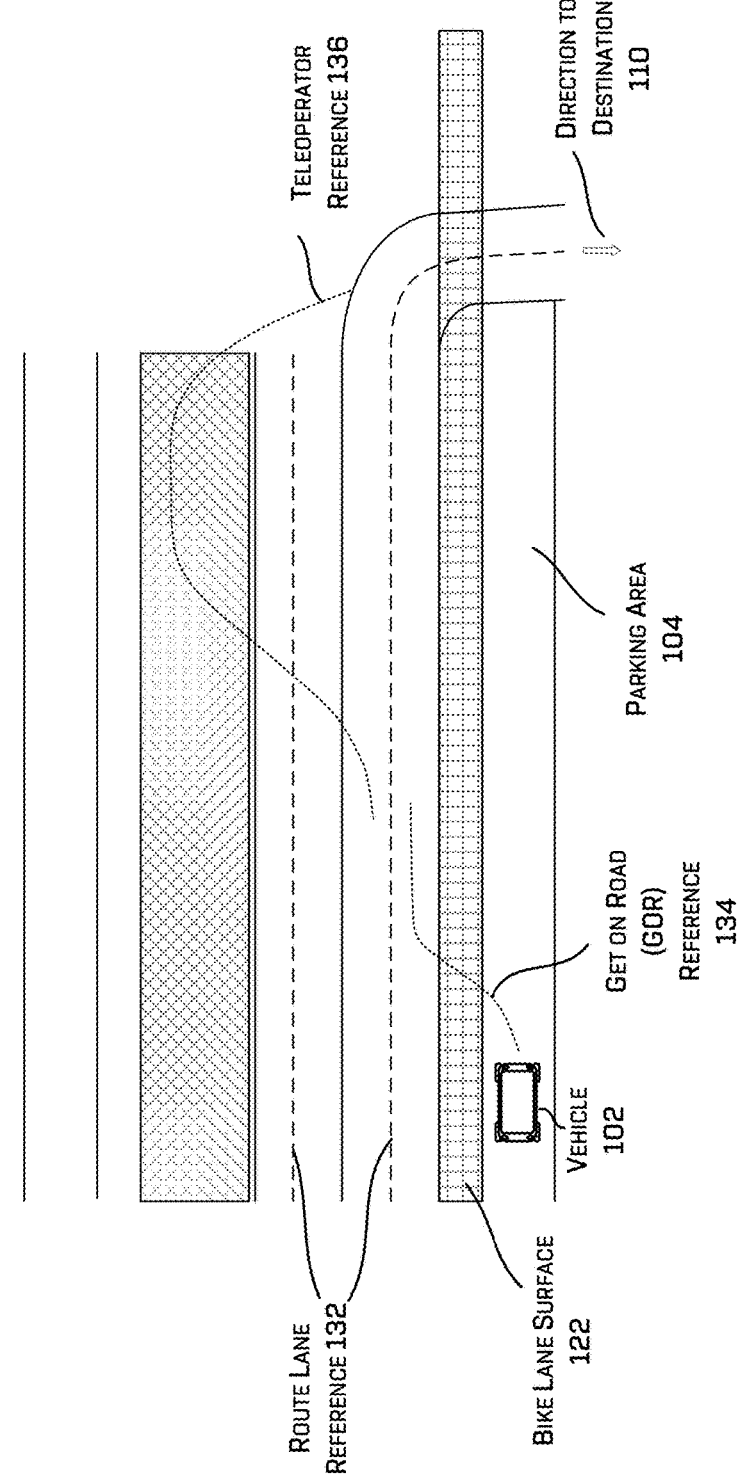

FIG. 1C illustrates an example set 130 of route references which may be utilized to determine the preferred surfaces of the example driving surface cost landscape that may be generated for the environment 100.

More particularly, the route references may include a route lane references 132. Route lane references may include any route lane area in the direction of travel along the vehicle's route. In some examples, the driving surface cost landscape may be generated for a portion of the vehicle's route to its destination rather than the entire route. For example, the driving surface cost landscape may be generated for eight seconds of the route. In this case, the portions of the route lanes reachable within eight seconds may be included in the route lane references 132. As illustrated, the route lane references 132 may indicate that the four lanes of the travel lanes 108 are route lanes up to the junction and that the lower two lanes continue to be route lanes after the junction (e.g., further highlighted in FIG. 1D as discussed below).

In addition, the route references may include a get on/off road (GOR) reference 134 and a teleoperator reference 136. A GOR reference 134 may be a special baseline trajectory that may be generated when the vehicle is starting from a parking space or area and attempting to get into a route lane or when the vehicle approaches a parking space to perform a parking maneuver to get into a parking space. In some examples, the GOR references may connect to route lane references such as route lane references 132. A teleoperator reference 136 may include control points that may be converted into a drive-line. This driveline may be considered a reference path. A teleoperator reference may be input where an obstacle (e.g., a stranded vehicle) has obstructed the route lanes and a teleoperator has provided input including control points that plot a path through the oncoming lanes to circumvent the obstacle. As depicted, the teleoperator reference 136 is exaggerated to illustrate that such a reference may pass through a non-preferred surface (i.e., oncoming lanes 112). In the example illustrated herein, the route lane references 132 3 used in combination with the teleoperator reference 136. In some examples, route lane references, such as route lane references 132, may be removed when a teleoperator reference is input. In such an example, the preferred surfaces of the driving surface cost landscape may not include areas that are associated with the route lane references but not the teleoperator reference.

Figure 1D:
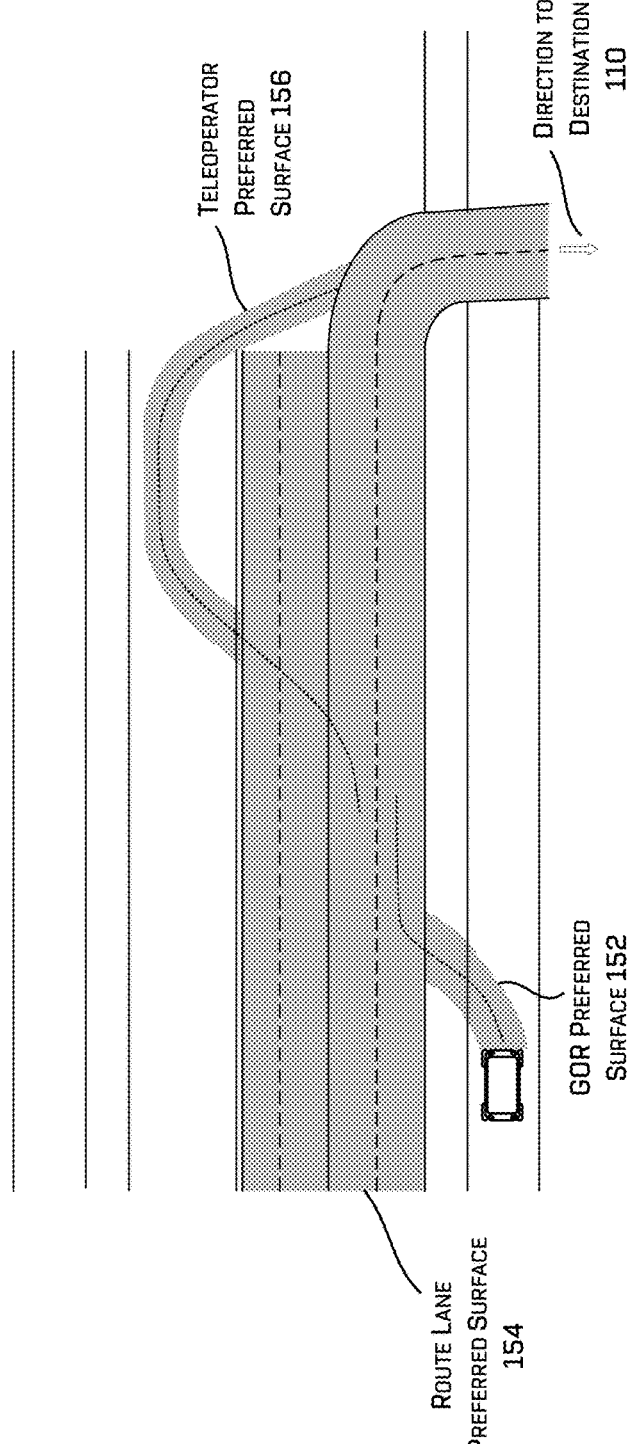

FIG. 1D illustrates a set 150 of example preferred surfaces of the example driving surface cost landscape that may be generated for the environment 100.

More particularly, the preferred surfaces may include a GOR preferred surface 152, a route lane preferred surface 154, and a teleoperator preferred surface 156. The preferred surfaces 152-156 may be generated based on the set of route references of FIG. 1C. The preferred surfaces may include the area spanned by the route references and laterally expanded to include lane boundaries (in the case of route lane references) or a fixed offset in the case of GOR references and teleoperator references. For example, the route lane preferred surface 154 includes the area between the boundaries of the four lanes of the travel lanes 108 up to the junction and area within the boundaries the lower two lanes that continue to be route lanes after the junction. The GOR preferred surface 152 may be determined to include an area around the GOR reference 134 expanded to an offset which may correspond to the width of the vehicle. Similarly, the teleoperator preferred surface 156 may be determined to include an area around the teleoperator reference 136 expanded to an offset which may correspond to the width of the vehicle. Though preferred surfaces 152-156 are shown as separate surfaces, this is for ease of discussion and implementations may or may not treat preferred surfaces generated for different references as separate preferred surfaces. In examples in which preferred surface are treated separately, each type of preferred surface may be represented as a heat map or heatmap layer of the driving surface cost landscape.

Figure 1E:
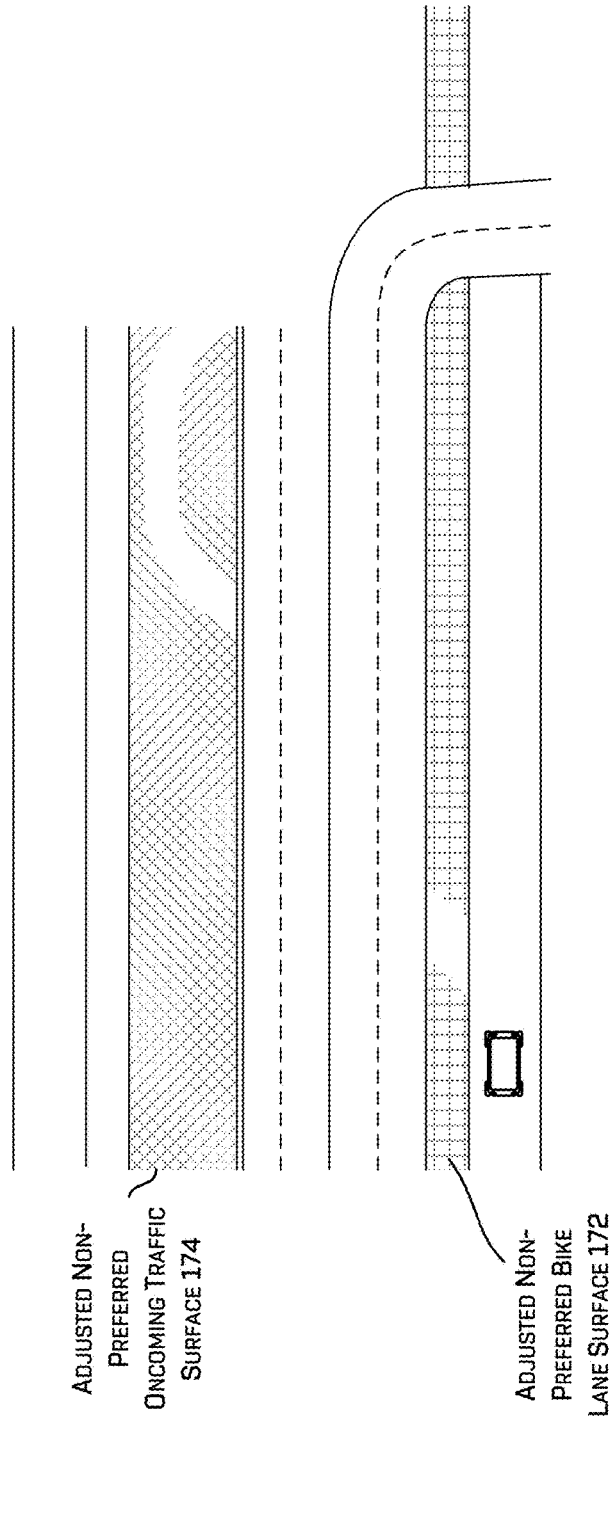

FIG. 1E illustrates a set 170 of example adjusted non-preferred surfaces of the example driving surface cost landscape that may be generated for the environment 100.

More particularly, the example adjusted non-preferred surfaces may include a non-preferred bike lane surface 172 and a non-preferred oncoming surface 174. As illustrated, the adjusted non-preferred surfaces may be determined by subtracting (e.g., masking or removing) the portions of the non-preferred surfaces that are also included in the preferred surfaces. In some examples, adjusted non-preferred surfaces may be categorized and/or typed. In such a case, each category or type of adjusted non-preferred surface may be represented as a heat map or heatmap layer of the driving surface cost landscape. Though not applicable to the example illustrated in FIGS. 1A-1F, in some examples, non-preferred surfaces may overlap. For example, a cross traffic non-preferred surface may overlap a bike lane non-preferred surface. In such examples, the non-preferred surfaces may comprise unique layers of heatmaps such that one or more costs associated with such layers may be separately evaluated. FIGS. 2A-2B illustrate an example in which non-preferred surfaces overlap and are discussed below.

Figure 1F:
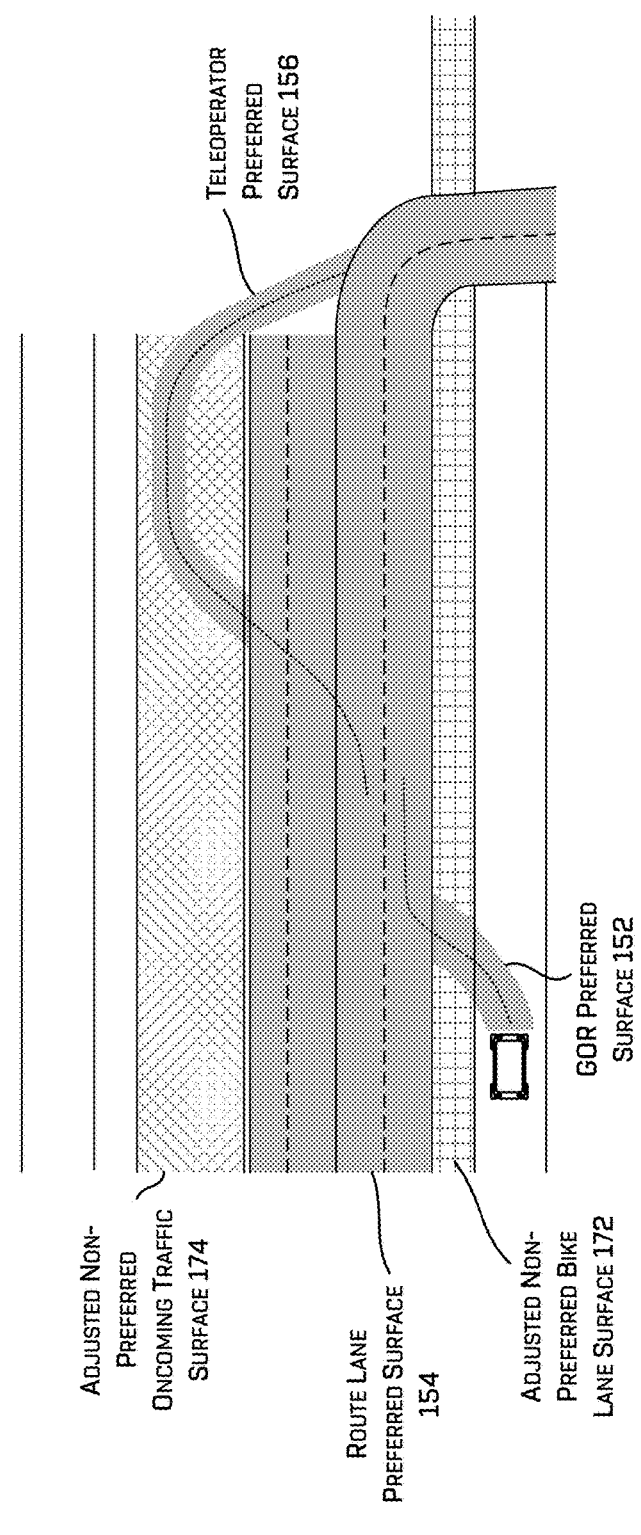
Figure 2A:
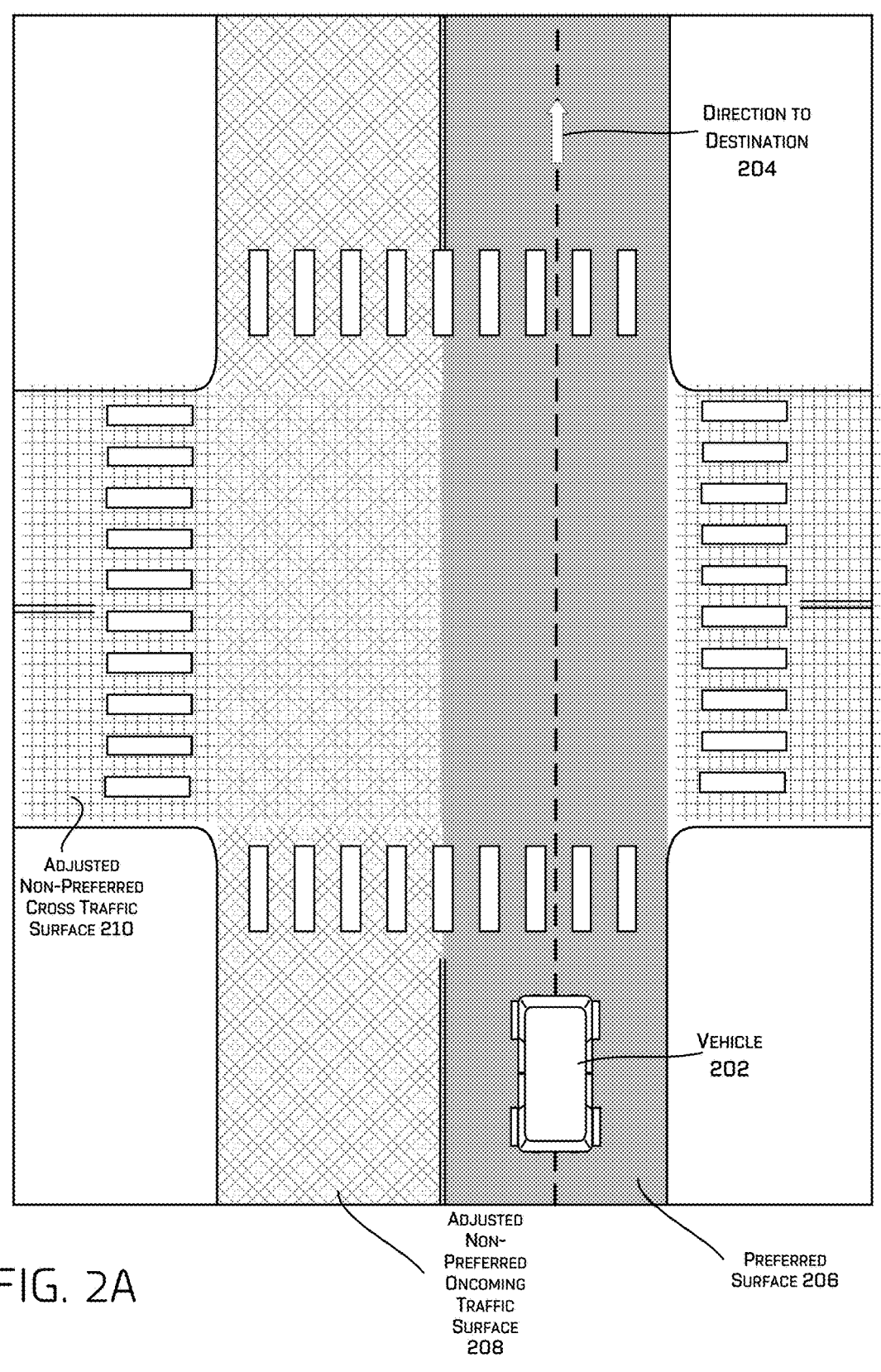
FIGS. 2A and 2B illustrate an example environment for which an example driving surface cost landscape is utilized to generate costs for one or more positions of a vehicle in the environment, in accordance with one or more examples of the disclosure.
Figure 2B:
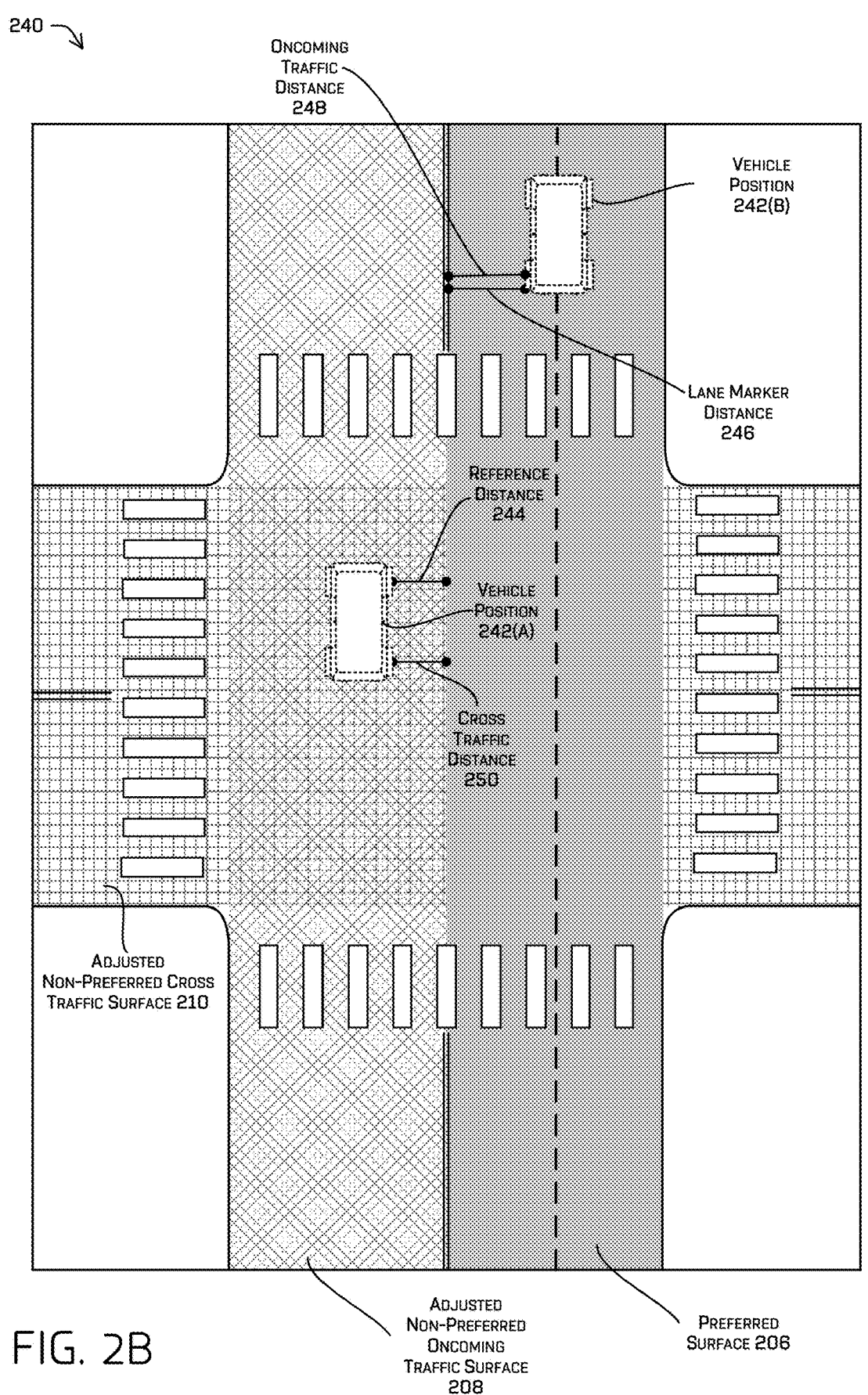

FIG. 1F illustrates an example driving surface cost landscape 180 that may be generated for the environment 100. As illustrated, the preferred surfaces of FIG. 1D may be combined with the adjusted non-preferred surfaces of FIG. 1E to form the driving surface cost landscape 180. However, while shown as a combined map, this is for purposes of illustration and explanation and implementations are not so limited. Rather, as discussed above, in some examples, the driving surface cost landscape 180 may include a plurality of heatmaps or heatmap layers including one or more preferred surface heatmaps or heatmap layers and one or more non-preferred surface heatmaps or heatmap layers.

FIGS. 2A and 2B illustrate an example environment for which an example driving surface cost landscape is utilized to generate costs for one or more positions of a vehicle in the environment.

As illustrated in FIG. 2A, the environment 200 includes a vehicle 202 that is approaching an intersection while traveling in the direction to its destination 204. A driving surface cost landscape for the area surrounding the intersection is illustrated which includes a preferred surface 206, an adjusted non-preferred oncoming traffic surface 208 and an adjusted non-preferred cross traffic surface 210. In the illustrated example, the non-preferred cross traffic surface overlaps with the non-preferred oncoming traffic surface. As such, an area of the non-preferred oncoming traffic surface that overlapped with the non-preferred cross traffic surface has been removed when determining the adjusted non-preferred oncoming traffic surface 208.

FIG. 2B illustrates an example diagram 240 of the usage of the driving surface cost landscape to generate costs for one or more positions of a vehicle in the environment 200. As discussed above, a planning component may utilize the preferred surfaces and adjusted non-preferred surfaces of the driving surface cost landscape to determine costs for positions in the environment associated with the driving surface cost landscape. For example, the planning component may determine a cost associated with the vehicle position and a boundary of the preferred surface and one or more costs associated with the vehicle position and boundaries of one or more non-preferred surfaces. More particularly, example costs may be determined for vehicle positions 242(A) and 242(B). Specifically, the generation of a reference distance cost and a cross traffic distance cost are discussed with regard to vehicle position 242(A) and a lane marker distance cost and an oncoming traffic distance cost are discussed with regard to vehicle position 242(B). The distances utilized in determining costs may be measured from a center of the vehicle, from various points on the vehicle, or a disk or region centered around the vehicle or a point on the vehicle. The planning component may also determine other costs for the vehicle position such as a cost associated with the position and lane markers, a cost associated with a driving speed and so on.

Based on the costs, the planning component may then determine a combined cost for the position in the environment. In the illustrated example, the planning component may determine costs for multiple adjusted non-preferred surfaces for the position. However, in other examples, the planning component may determine the adjusted non-preferred surface to the position and determined a non-preferred surface cost for that type of non-preferred surface but not other types of non-preferred surfaces (e.g., oncoming lane vs bike lane). The number of and which types of non-preferred surfaces to be considered for a vehicle position may be selected or weighted based on a variety of criteria, depending on the implementation.

The planning component may determine a reference distance cost based on a reference distance 244. For example, the planning component may query the preferred surface 206 to determine the reference distance 244 as the distance to the nearest preferred surface. The reference distance cost may represent a cost for diverging from the preferred surface 206. In some examples, a quadratic function can be used to determine a reference distance cost for the reference distance 244. For example, a reference distance cost may be determined as:

$$\text{cost} = c \cdot v_H \cdot p, \; p = d^2$$

where $V_H$ may be the speed of the vehicle 202, c may be a constant, and d may be the reference distance 244 to the nearest preferred surface boundary of the preferred surface 206. Of course, this is not meant to be so limiting. Any other cost which penalizes motion in the non-preferred areas is contemplated. In the illustrated example, the reference distance 244 for a vehicle inside the boundaries of the preferred surface 206 may be set to zero (0) (e.g., the reference distance cost may be zero (0)) and a positive value for a vehicle position outside the boundary of the preferred surface 206. The speed of the vehicle 202 may be included in the quadratic function to ensure that the reference distance cost along a fixed spatial path is invariant to the speed of the vehicle moving along the trajectory. In some examples, this may be useful to avoid penalizing moving more slowly back to the preferred surface 206 (e.g., for the same fixed spatial path), which may avoid an unnecessary conflict with costs associated with passenger comfort. Of course, in other examples, such a cost may be independent of velocity, depend on accelerations, or otherwise.

Other functions may be used in place of the quadratic function. In some example, a Huber-loss may be utilized. A Huber-loss function may output a cost that is quadratic around a zero distance but may become linear at some reference distance 244. In some examples, using a Huber-loss function may ensure that the reference distance cost does not become quadratically large with large reference distances 244. In other examples, a sigmoidal function may be utilized. A sigmoidal function may perform a similar function but may eventually make the reference distance cost constant at large reference distances rather than linear. In other examples, a linear function may be utilized instead of a Huber-loss function to also make the reference distance cost linear at zero.

In the illustrated example, the reference distance cost is zero for vehicle positions within the preferred surface 206. However, in other examples, the reference distance cost function may provide different costs depending on how far inside the preferred surface boundary the vehicle position is (e.g., the reference distance 244 may be negative if the vehicle position 242 is within the preferred surface 206 and positive if the vehicle position 242 is outside the preferred surface 206).

In other examples, the reference distance 244 may be a measure of the distance from the vehicle position to the center of the portion of the preferred surface 206 associated with the vehicle position. Some examples may also include a parameter in the determination of the reference distance cost to reflect a lane-width or a width of the GOR paths or a width of teleoperator paths. By including such a width parameter, the planning component may determine the cost without assigning higher costs to wider lanes. In some examples, the planning component may scale the reference distance 244 to a value representative of a relative lateral position in the lane rather than a distance measure (e.g., a scale of −1 for the lane center, 0 for a position on the lane boundary, 1 for a lane's width outside of the preferred surface lane boundary and so on). The use of relative measures of displacement from the center of the preferred surface 206 may include a query to the preferred surface 206 heatmap to provide a distance to the nearest preferred surface boundary and also provide the "reference width" associated with that point. Additionally, a "reference width" may be specified for teleoperator references and GOR references. In such examples, the reference distance cost function may be chosen based on the selected manner of measuring the reference distance.

As discussed above, the driving surface cost landscape may be determined for a portion of the route of the vehicle, rather than the entirety of the route (e.g., an eight second horizon). Determining the driving surface cost landscape for a portion of the route may avoid errors that may arise for a route which double back or otherwise intersect over its length. For example, if a vehicle's route goes around a roundabout and intersects itself, a horizon for the driving surface cost landscape may avoid having route planning on the preferred surface erroneously provide a low cost to the roundabout exit as the vehicle is entering the roundabout.

The planning component may further determine a lane marker distance cost based on a lane marker distance 246. For example, the planning component may query a map corresponding to the preferred surface 206 to determine a lane marker distance 246 as the distance to the nearest lane marker. In some examples, when the vehicle is outside the preferred surface, the planning component may query the map to determine a nearest lane marker in the non-preferred surface most closely associated with the vehicle (e.g., a non-preferred surface the vehicle is positioned inside of). The lane marker distance cost may represent a cost for straddling lane marks when driving. In some examples, the lane marker distance cost the lane cost will be defined as:

$$\text{cost} = c \cdot v_H \cdot p, \ p = \max\{0, (1 - d/d_{max})^2\}$$

where c is a constant, $V_H$ may be the speed of the vehicle 202, and d may be the lane marker distance 246, and $d_{max}$ may be a tunable parameter that marks a distance where the lane marker distance cost becomes zero. As above, the speed of the vehicle 202 may be optionally included in the function to ensure that the lane marker distance cost along a fixed spatial path is invariant to the speed of the vehicle moving along the trajectory. The constant, c, can also be configurable based on the type of lane mark the vehicle 202 is closest to (e.g., solid white line, dashed white line, double yellow lines, etc.) or environment characteristics such as whether the position is in a junction or regular road segment.

The planning component may further determine non-preferred surface distance costs based on distances to the non-preferred surfaces. For example, the planning component may query the non-preferred surfaces (e.g., the adjusted non-preferred oncoming traffic surface 208, the adjusted non-preferred cross traffic surface 210, an adjusted non-preferred bike lane surface, etc.) to determine non-preferred surface distance costs based on distances to the associated non-preferred surface boundaries. For the vehicle position 242(B), the oncoming traffic distance 248 may be used to determine the non-preferred surface distance cost. For the vehicle position 242(A), the cross traffic distance 250 may be used to determine the non-preferred surface distance cost. The non-preferred surface distance cost may represent a cost for traversing the non-preferred surfaces (e.g., surfaces 208 and 210). In some examples, the non-preferred surface distance cost function may be constant across different categories of non-preferred surfaces. However, examples are not so limited and parameters can be category specific.

In some examples, a non-preferred surface distance cost may be determined as:

$$\text{cost} = c_{type} \cdot v_H \cdot p, \ p = \max\{0, \min\{1, 0.5 \cdot (1 - d/d_{max})^2\}\}$$

where $c_{type}$ is a constant defined for a specific category of non-preferred surface, $V_H$ may be the speed of the vehicle 202, d may be a signed distance (e.g., distance 248 or 250) to the nearest boundary of the type or category of non-preferred surface and $d_{max}$ may be a tunable parameter that marks a distance where the non-preferred surface distance cost becomes zero. As mentioned above, in some examples, $c_{type}$ may be a constant c for all types of non-preferred surfaces. In the illustrated example, the non-preferred surface distances (e.g., distances 248 and 250) may be negative if the vehicle position 242 is within the non-preferred surface 208 and positive if the vehicle position 242 is outside the non-preferred surface 208. The speed of the vehicle 202 may be included in the non-preferred surface distance cost function to ensure that the reference distance cost along a fixed spatial path is invariant to the speed of the vehicle moving along the trajectory. In some examples, the value of $d_{max}$ may be set such that the value of p is 0 when the vehicle position is outside the non-preferred surfaces, the value of p is 0.5 when the vehicle position is on the border of the non-preferred surface and the value of p is 1 when the vehicle position is inside the non-preferred surfaces.

The planning component may further determine other costs for a vehicle position and/or trajectory. For example, the planning component may determine a roadspeed cost for the vehicle position in a trajectory. In some examples, a roadspeed cost can be defined as:

$$\text{cost} = c \cdot \max\{0, \, \text{sign}(v_H - v_{road})(v_H - v_{road})^2\}$$

where c may be a constant, $V_H$ may be the speed of the vehicle 202, and $v_{road}$ may be a roadspeed. In some examples, the planning component may determine a roadspeed for the vehicle position as the roadspeed associated with the nearest preferred surface.

The planning component may further determine a combined or overall cost of a vehicle position based on the reference distance cost, the lane marker distance cost, the adjusted non-preferred surface cost and/or the other costs such as the roadspeed cost. For example, the planning component may determine the combined cost as a weighted summation of the various costs. In some examples, the planning component may combine the costs such that the reference distance cost may be given a low weight, the lane marker distance cost may be given a medium weight, and the adjusted non-preferred surface cost may be given a higher weight. In some examples, the combined cost may be utilized in determining a cost for a trajectory for the vehicle to follow which includes the vehicle position. In addition or alternatively, the individual costs for the vehicle position may be used to determine a cost for a trajectory for the vehicle to follow which includes the vehicle position.

Processes 300-500 are illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

Figure 3:
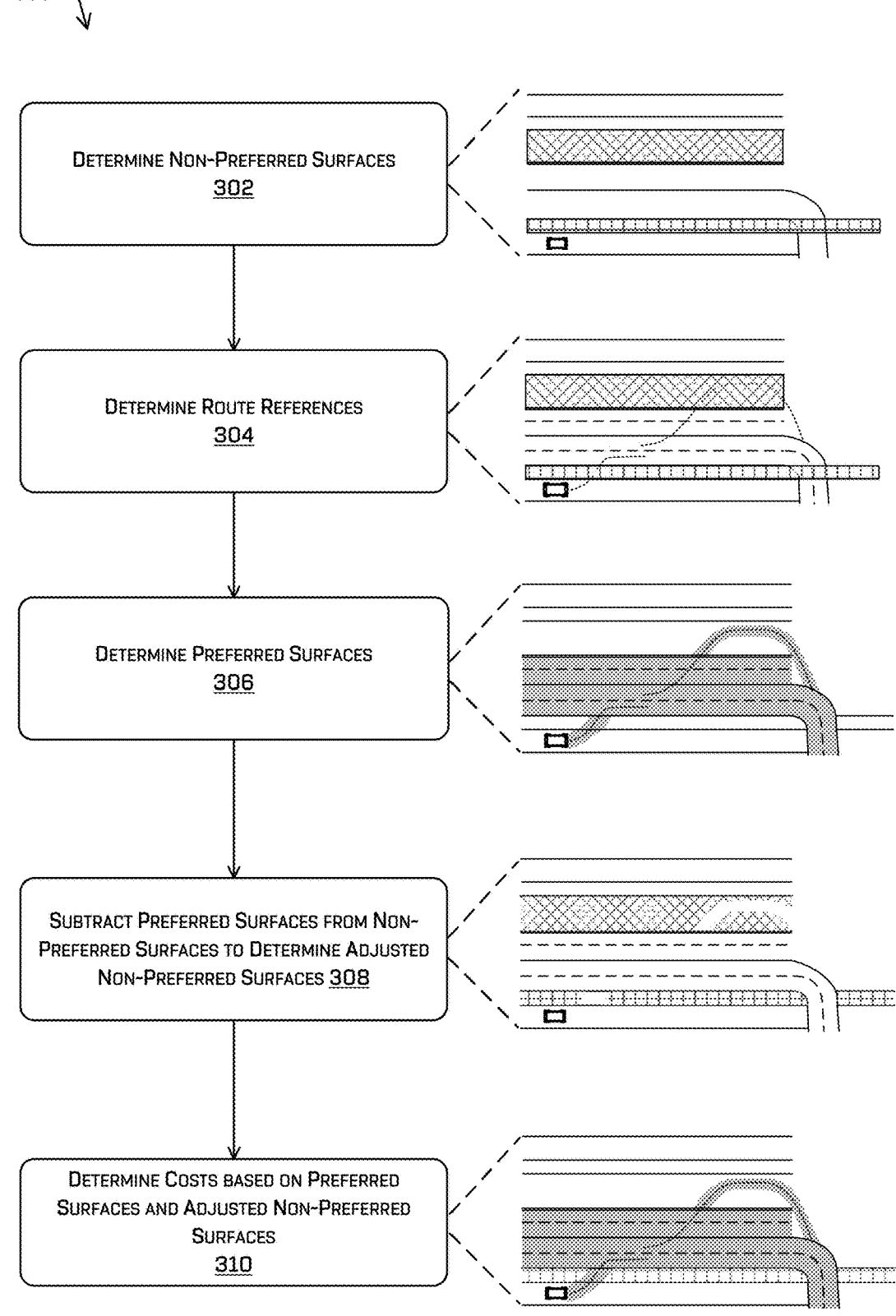
FIG. 3 is a pictorial flow diagram illustrating an example process for generating an example driving surface cost landscape and determining vehicle position costs based on the preferred surface(s) and non-preferred surfaces of the driving surface cost landscape, in accordance with one or more examples of the disclosure.

FIG. 3 is a pictorial flow diagram illustrating an example process 300 for generating an example driving surface cost landscape and determining vehicle position costs based on the preferred surface(s) and non-preferred surface(s) of the driving surface cost landscape.

Some or all of the operations in the example process 300 may be performed by a planning component integrated within a perception component, a prediction component, a planning component, and/or other components and systems within an autonomous vehicle. In some examples, the planning component may include various components, such as an encoder component, a machine-learning model component, and/or a tree structure component which may be configured to determine a control trajectory for the vehicle to follow based on costs determined using the driving surface cost landscape.

At operation 302, the planning component may determine one or more non-preferred surfaces for a route or a portion of a route of a vehicle. Operation 302 may be performed as discussed above with respect to FIG. 1B. In the illustrated example, the planning component may determine the non-preferred surfaces include a bike lane non-preferred surface and an oncoming traffic non-preferred surface.

At operation 304, the planning component may determine one or more route references for the route or the portion of the route of the vehicle. Operation 304 may be performed as discussed above with respect to FIG. 1C. As discussed above, the route references may include route lane references, GOR references, teleoperator references and so on. The route references may be utilized to determine the preferred surface(s) of a driving surface cost landscape.

At operation 306, the planning component may determine one or more preferred surfaces based on the route references for the route or the portion of the route of the vehicle. Operation 306 may be performed as discussed above with respect to FIG. 1D.

At operation 308, the planning component may determine one or more adjusted non-preferred surfaces by subtracting the preferred surfaces from the non-preferred surfaces. Operation 308 may be performed as discussed above with respect to FIG. 1E. As illustrated, portions of the non-preferred surfaces that overlap with the preferred surfaces may be removed in the resulting adjusted non-preferred surfaces.

At operation 310, the planning component may determine costs for vehicle positions along the route or the portion of the route of the vehicle based on the preferred surface(s) and the adjusted non-preferred surface(s). In some examples, the costs may be used to evaluate or chose a control trajectory from among a set of candidate trajectories. Operation 310 may be performed as discussed above with respect to FIGS. 2A-2B and below with respect to FIG. 4.

Figure 4:
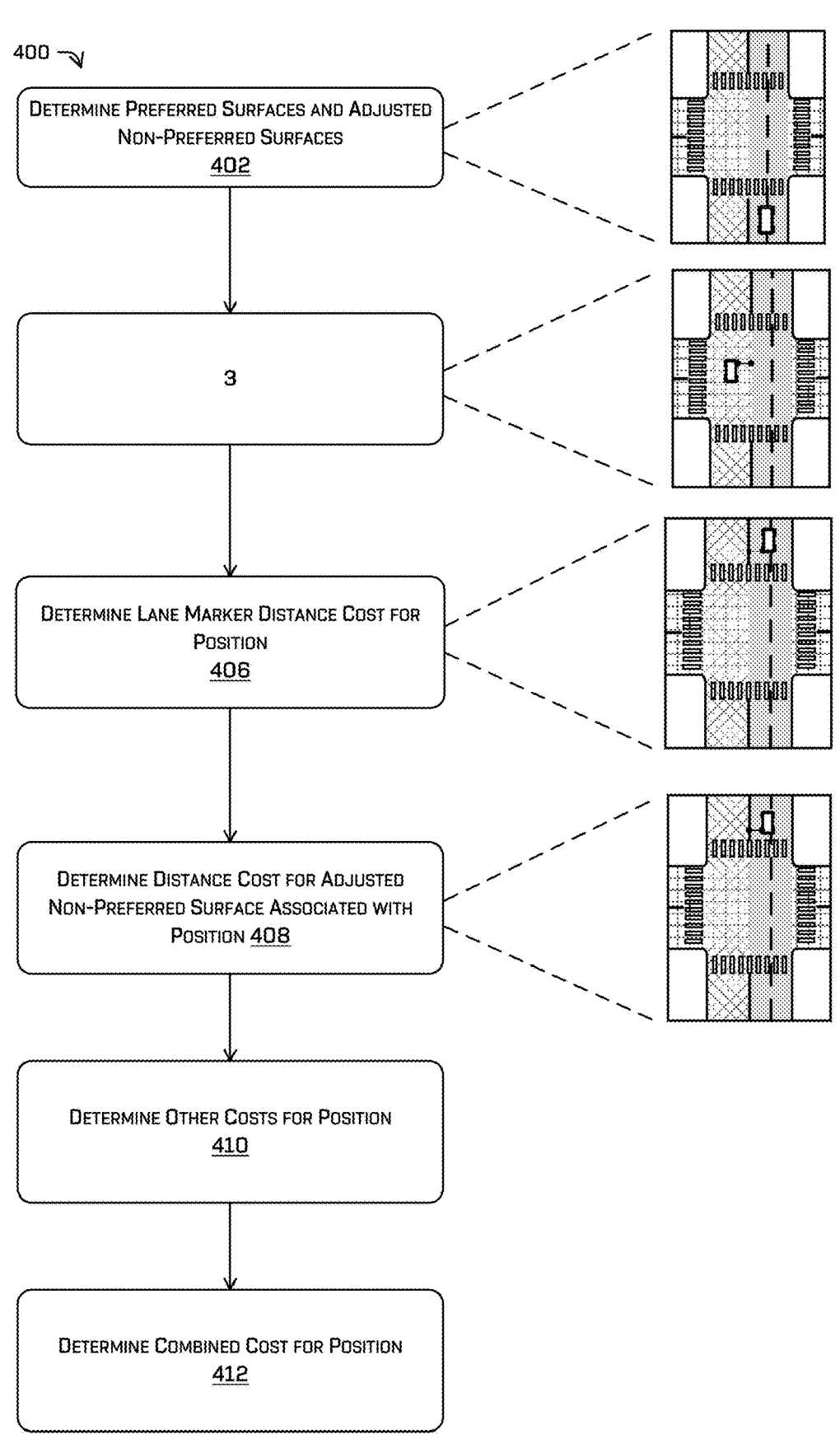
FIG. 4 illustrates an example pictorial flow diagram illustrating an example process for determining vehicle position costs based on the preferred surface(s) and non-preferred surfaces of a driving surface cost landscape, in accordance with one or more examples of the disclosure.

FIG. 4 is a pictorial flow diagram illustrating an example process 400 for determining vehicle position costs based on the preferred surface(s) and non-preferred surface(s) of a driving surface cost landscape.

Some or all of the operations in the example process 400 may be performed by a planning component integrated within a perception component, a prediction component, a planning component, and/or other components and systems within an autonomous vehicle. In some examples, the planning component may include various components, such as an encoder component, a machine-learning model component, and/or a tree structure component which may be configured to determine a control trajectory for the vehicle to follow based on costs determined based on the driving surface cost landscape.

At operation 402, the planning component may determine one or more preferred surfaces and one or more adjusted non-preferred surfaces for a route or a portion of a route of a vehicle. Operation 402 may be performed as discussed above with respect to FIGS. 1A-2A. In the illustrated example, the planning component may determine a preferred surface, an oncoming traffic non-preferred surface and a cross traffic non-preferred surface as discussed above with regard to FIG. 2A.

At operation 404, the planning component may determine, for a vehicle position along a route or a portion of the route of the vehicle, a reference distance cost. Operation 404 may be performed as discussed above with respect to FIG.

2B. As discussed above, the reference distance cost may represent a cost for diverging from the preferred surface.

At operation 406, the planning component may determine, for the vehicle position along the route or the portion of the route of the vehicle, a lane marker distance cost. Operation 406 may be performed as discussed above with respect to FIG. 2B. As discussed above, the lane marker distance cost may represent a cost for straddling lane marks when driving.

At operation 408, the planning component may determine, for the vehicle position along the route or the portion of the route of the vehicle, a non-preferred surface distance cost. Operation 408 may be performed as discussed above with respect to FIG. 2B. As discussed above, the non-preferred surface distance cost may represent a cost for traversing the non-preferred surfaces when driving.

At operation 410, the planning component may determine other costs for the vehicle position along the route or the portion of the route of the vehicle. Operation 410 may be performed as discussed above with respect to FIG. 2B. As discussed above, the other costs may include costs such as a roadspeed cost.

At operation 412, the planning component may determine a combined cost for the vehicle position along the route or the portion of the route of the vehicle. Operation 412 may be performed as discussed above with respect to FIG. 2B. As discussed above, in some examples, the planning component may perform a weighted summation to combine the costs.

FIG. 5 is a flow diagram illustrating an example process 500 for determining a control trajectory from candidate trajectories using a driving surface cost landscape. Some or all of the operations in the example process 500 may be performed by a planning component integrated within a perception component, a prediction component, a planning component, and/or other components and systems within an autonomous vehicle. In some examples, the planning component may include various components, such as an encoder component, a machine-learning model component, and/or a tree structure component which may be configured to determine a control trajectory for the vehicle to follow based on costs determined based on the driving surface cost landscape.

At 502, the planning component may receive data from various components of the vehicle. In some examples, the types of data may include vehicle mission data, state data, object data, road feature data, and/or any other type of data. At 504, the planning component may determine one or more preferred surfaces and one or more adjusted non-preferred surfaces for a route or portion of a route of the vehicle associated with the candidate trajectories. Operations 502-504 may be performed as discussed above with respect to FIGS. 1A-4.

At 506, the planning component may determine one or more candidate trajectories for the vehicle based on the received data. Example techniques for encoding data can be found, for example, in U.S. application Ser. No. 17/855,088, filed Jun. 30, 2022, and titled "Machine-Learned Component for Vehicle Trajectory Generation", as well as in U.S. application Ser. No. 18/072,015, filed Nov. 30, 2022, and titled "Vehicle Trajectory Tree Search for Off-Route Driving Maneuvers" the contents of which are herein incorporated by reference in their entirety and for all purposes. Example techniques for generating a tree structure and determining a control trajectory based on the tree structure can be found, for example, in U.S. application Ser. No. 17/900,658, filed Aug. 21, 2022, and titled "Trajectory Prediction Based on a Decision Tree", the contents of which is herein incorporated by reference in its entirety and for all purposes. Example techniques for using one or more machine-learning models may be used to output a diverse set of candidate trajectories can be found, for example, in U.S. application Ser. No. 18/204,097, filed May 31, 2023, and titled "Vehicle Trajectory Tree Structure including Learned Trajectories", the contents of which is herein incorporated by reference in its entirety and for all purposes. Additionally, or alternatively, the received data may comprise, for example, remote operator-provided references, GOR references, etc.

At 508, the planning component may determine costs for the candidate trajectories based at least on the preferred surfaces and the adjusted non-preferred surfaces of the driving surface cost landscape. Operation 508 may be performed as discussed above with respect to FIGS. 1A-4. For example, costs for vehicle positions included in the candidate trajectories may be determined at least in part as discussed above for vehicle positions along a route.

At 510, the planning component may determine a control trajectory for the vehicle based at least on the costs determined for the candidate trajectories using the driving surface cost landscape. Then, at 512, the planning component may control the vehicle based on the control trajectory. Following 512, the process may return to 502 for additional operations.

Figure 6:
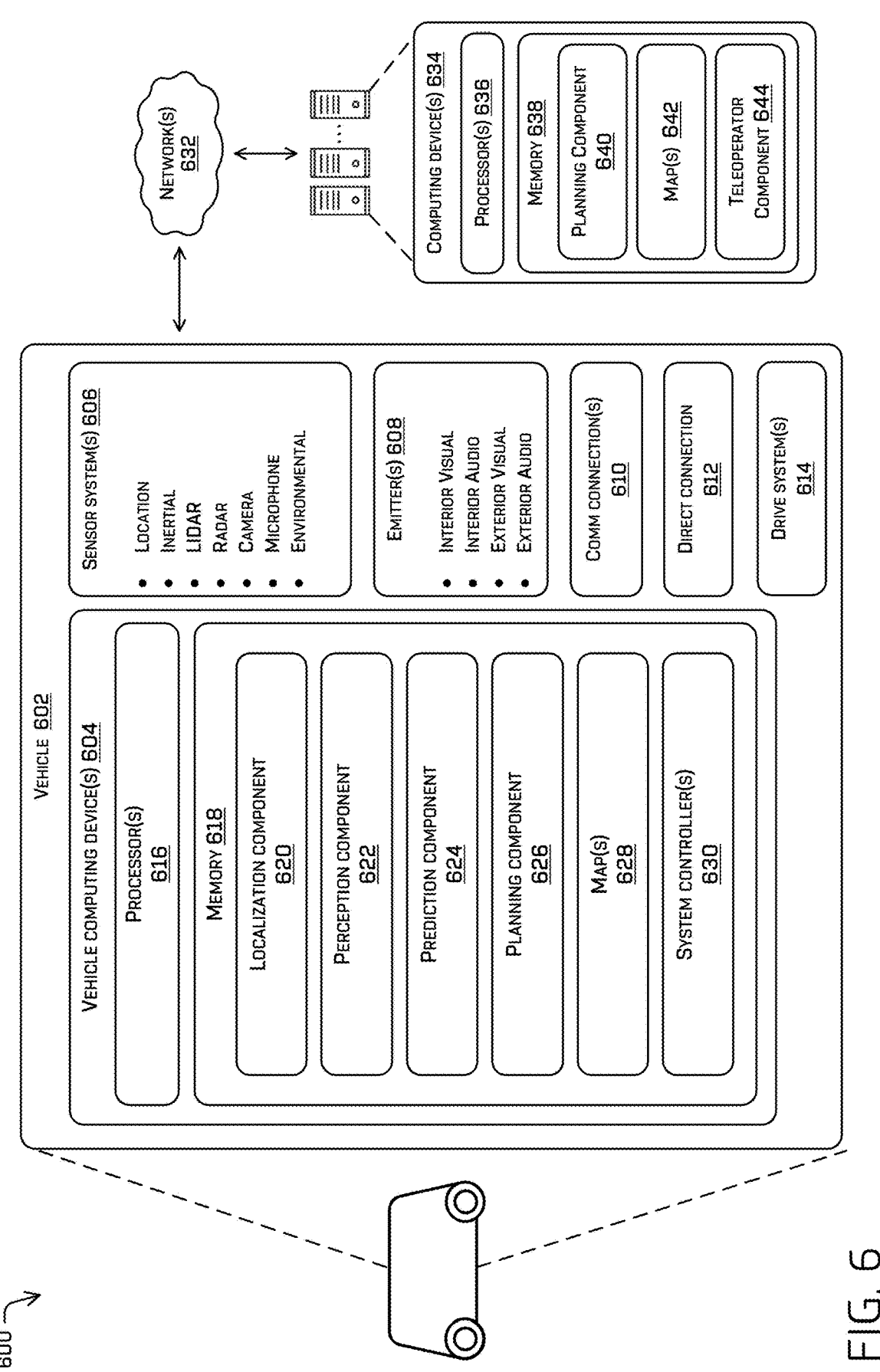
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a prediction component 624, a planning component 626, one or more system controllers 630, and one or more maps 628 (or map data). Though depicted in FIG. 6 as residing in the memory 618 for illustrative purposes, it is contemplated that the localization component 620, the perception component 622, the prediction component 624, the planning component 626, system controller(s) 630, and/or the map(s) may additionally, or alternatively, be accessible to the vehicle 602 (e.g., stored on, or otherwise accessible by, memory remote from the vehicle 602, such as, for example, on memory 638 of one or more computing device 634 (e.g., a remote computing device)). In some examples, the memory 638 may include a planning component 640, maps 642 (or map data), and a teleoperator component 644.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 628, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 624 may generate one or more probability maps representing prediction probabilities of possible locations of one or more objects in an environment. For example, the prediction component 624 may generate one or more probability maps for vehicles, pedestrians, animals, and the like within a threshold distance from the vehicle 602. In some instances, the prediction component 624 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 624 may generate predicted trajectories of objects (e.g., objects) in an environment. For example, the prediction component 624 may generate one or more predicted trajectories for objects within a threshold distance from the vehicle 602. In some examples, the prediction component 624 may measure a trace of an object and generate a trajectory for the object based on observed and predicted behavior.

In general, the planning component 626 may determine a path for the vehicle 602 to follow to traverse through an environment. For example, the planning component 626 may determine various routes and trajectories and various levels of detail. For example, the planning component 626 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 626 May generate an instruction for guiding the vehicle 602 along at least a portion of the route from the first location to the second location. In at least one example, the planning component 626 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 626 may select a trajectory for the vehicle 602.

In other examples, the planning component 626 may alternatively, or additionally, use data from the localization component 620, the perception component 622, and/or the prediction component 624 to determine a path for the vehicle 602 to follow to traverse through an environment. For example, the planning component 626 may receive data (e.g., object data) from the localization component 620, the perception component 622, and/or the prediction component 624 regarding objects associated with an environment. In some examples, the planning component 626 receives data for relevant objects within the environment. Using this data, the planning component 626 may determine a route to travel from a first location (e.g., a current location) to a second location (e.g., a target location) to avoid objects in an environment. In at least some examples, such a planning component 626 may determine there is no such collision-free path and, in turn, provide a path that brings vehicle 602 to a safe stop avoiding all collisions and/or otherwise mitigating damage.

The planning component 626 may also perform any of the techniques described with respect to any of FIGS. 1A-5 above with respect to determining a driving surface cost landscape, determining costs of vehicle positions or candidate trajectories using the driving surface cost landscape and/or determining a control trajectory based on the costs of the vehicle positions or candidate trajectories.

In at least one example, the vehicle computing device 604 may include one or more system controllers 630, which may be configured to control steering, propulsion, braking, safety, emitters, communication, and other systems of the vehicle 602. The system controller(s) 630 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, the prediction component 624, and/or the planning component 626 to determine a location of the vehicle 602, detect objects in an environment, generate routes, determine actions and/or trajectories to navigate within an environment.

In some examples, the one or more maps 628 may be stored as maps 642 on a remote computing device(s) (such as the computing device(s) 634) accessible via network(s) 632. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 638, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 632, to the one or more computing device(s) 634 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 634, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 632. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 624, the planning component 626, the one or more system controllers 630, and the one or more maps 628 may process sensor data, as described above, and may send their respective outputs, over the one or more network(s) 632, to the computing device(s) 634. In at least one example, the localization component 620, the perception component 622, the prediction component 624, the planning component 626, the one or more system controllers 630, and the one or more maps 628 may send their respective outputs to the computing device(s) 634 at a particular frequency, after a lapse of a predetermined period of time, in near real-time, etc.

In some examples, the vehicle 602 may send sensor data to the computing device(s) 634 via the network(s) 632. In some examples, the vehicle 602 may receive sensor data from the computing device(s) 634 and/or remote sensor system(s) via the network(s) 632. The sensor data may include raw sensor data and/or processed sensor data and/or representations of sensor data. In some examples, the sensor data (raw or processed) may be sent and/or received as one or more log files.

The computing device(s) 634 may include processor(s) 636 and a memory 638, which may a planning component 640, a maps 642, and a teleoperator component 644. In some examples, the memory 638 may store one or more of components that are similar to the component(s) stored in the memory 618 of the vehicle 602. In such examples, the computing device(s) 634 may be configured to perform one or more of the processes described herein with respect to the vehicle 602. In some examples, the planning component 640 and the maps 642 may perform substantially similar functions as the planning component 626 and maps 628. In some examples, the teleoperator component 644 may provide an interface for a teleoperator to provide control inputs to the vehicle 602 (e.g., teleoperator reference data or teleoperator route references such as teleoperator reference 136).

The processor(s) 616 of the vehicle 602 and the processor(s) 636 of the computing device(s) 634 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 638 are examples of non-transitory computer-readable media. The memory 618 and memory 638 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 634 and/or components of the computing device(s) 634 may be associated with the vehicle 602. That is, the vehicle 602 may perform one or more of the functions associated with the computing device(s) 634, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a driving surface cost landscape without determining a costs for vehicle positions based thereon. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A: A system comprising: one or more processors; and one or more non-transitory computer-readable media storing computer-executable instructions that, when executed, cause the one or more processors to perform operations comprising: determining one or more candidate trajectories for an autonomous vehicle to traverse an environment; determining, based at least in part on a portion of a route of the autonomous vehicle through of the environment, a non-preferred surface associated with a first portion of the environment which, based at least in part on a policy, is to be avoided by the autonomous vehicle; receiving a route reference associated with the portion of the route of the autonomous vehicle through of the environment; determining, based at least in part on the route reference, a preferred surface associated with a second portion of the environment on which, based at least in part on the policy, the autonomous vehicle is allowed to drive; determining an adjusted non-preferred surface by removing an overlapping area of the non-preferred surface that overlaps the preferred surface; determining a cost for a candidate trajectory based at least on the preferred surface and the adjusted non-preferred surface; determining a control trajectory for the autonomous vehicle, based at least in part on the cost; and controlling the autonomous vehicle based at least in part on the control trajectory.

B. The system of clause A, wherein the non-preferred surface is one or more of: a bike lane, an oncoming traffic lane, a cross traffic area, a parking area, a high occupancy vehicle lane, a center left turn lane, a time restricted driving lane, an area between separated turning lanes in straight lanes, a junction drivable surface, a bus lane, or a taxi lane.

C. The system of one of clauses A or B, wherein the route reference is associated with one or more of: a traffic lane for traffic traveling in a direction toward a destination of the autonomous vehicle, a parking trajectory, a get on/off road trajectory, or a path associated with teleoperator input.

D The system of one of clauses A-C, wherein determining the cost for the candidate trajectory comprises one or more of: determining, for a position of the autonomous vehicle in the environment, a reference distance cost based at least in part on a reference distance of the position outside a boundary of the preferred surface, or determining a non-preferred surface distance cost based at least in part on a non-preferred surface distance of the position to a nearest boundary of the non-preferred surface.

E. The system of one of clauses A-D, wherein determining the cost for the candidate trajectory comprises combining the reference distance cost with the non-preferred surface distance cost using a function that includes a first weight for the non-preferred surface distance cost and a second weight for the reference distance cost.

F. One or more non transitory computer readable media storing instructions executable by one or more processors, wherein the instructions, when executed, cause the one or more processors to perform operations comprising: determining, based at least in part on a portion of a route of an autonomous vehicle through of an environment, a non-preferred surface associated with a portion of the environment to avoid when driving; receiving a route reference associated with the portion of the route of the autonomous vehicle through of the environment; determining, based at least in part on the route reference, a preferred surface; determining an adjusted non-preferred surface by removing an overlapping area of the non-preferred surface that overlaps the preferred surface; determining, based at least in part on the preferred surface, the adjusted non-preferred surface, and a position of the autonomous vehicle, a cost; and determining a control trajectory for the autonomous vehicle based at least in part on the cost associated with the vehicle position.

G. The one or more non transitory computer readable media of clause F, wherein the non-preferred surface is one or more of: a bike lane; an oncoming traffic lane; a cross traffic area; a parking area; a high occupancy vehicle lane; a center left turn lane; a time restricted driving lane; an area between separated turning lanes in straight lanes; a junction drivable surface, a bus lane; or a taxi lane.

H. The one or more non transitory computer readable media of one of clauses F or G, wherein the route reference is associated with one or more of: one or more traffic lanes for traffic traveling in a direction toward a destination of the autonomous vehicle; a parking trajectory; a get on/off road trajectory; or a path associated with a teleoperator input.

I. The one or more non transitory computer readable media of one of clauses F-H, wherein determining the cost associated with the vehicle position in the environment based at least on the preferred surface or the adjusted non-preferred surface comprises one or more of: determining, for the vehicle position in the environment, a reference distance cost based at least in part on a reference distance of the vehicle position outside a boundary of the preferred surface; or determining, for the vehicle position in the environment, a non-preferred surface distance cost based at least in part on a non-preferred surface distance of the vehicle position to a nearest boundary of the non-preferred surface.

J. The one or more non transitory computer readable media of one of clauses F-I, wherein determining the cost associated with the vehicle position in the environment comprises combining the reference distance cost with the non-preferred surface distance cost using a function that includes a first weight for the non-preferred surface distance cost and a second weight for the reference distance cost.

K. The one or more non transitory computer readable media of one of clauses F-J, wherein the operations further comprise: controlling the autonomous vehicle based at least in part on the control trajectory.

L. The one or more non transitory computer readable media of one of clauses F-K, wherein the determining, based at least in part on the preferred surface, the adjusted non-preferred surface, and the position of the autonomous vehicle, the cost is based at least in part on a cost entry in a heat map of at least one of the preferred surface and the adjusted non-preferred surface.

M. The one or more non-transitory computer-readable media of one of clauses F-L, wherein the determining the cost is further based at least in part on second cost entry in a second heat map associated with a second adjusted non-preferred surface.

N. A method comprising: determining, based at least in part on a portion of a route of an autonomous vehicle through of an environment, a non-preferred surface associated with a portion of the environment to avoid when driving; receiving a route reference associated with the portion of the route of the autonomous vehicle through of the environment; determining, based at least in part on the route reference, a preferred surface; determining an adjusted non-preferred surface by removing an overlapping area of the non-preferred surface that overlaps the preferred surface; determining, based at least in part on the preferred surface, the adjusted non-preferred surface, and a position of the autonomous vehicle, a cost; determining a control trajectory for the autonomous vehicle based at least in part on the cost associated with the vehicle position; and controlling the autonomous vehicle based at least in part on the control trajectory.

O. The method of clause N, wherein the non-preferred surface is one or more of: a bike lane; an oncoming traffic lane; a cross traffic area; a parking area; a high occupancy vehicle lane; a center left turn lane; a time restricted driving lane; an area between separated turning lanes in straight lanes; a junction drivable surface, a bus lane; or a taxi lane.

P. The method of one of clauses N or O, wherein the route reference is associated with one or more of: one or more traffic lanes for traffic traveling in a direction toward a destination of the autonomous vehicle; a parking trajectory; a get on/off road trajectory; or a path associated with a teleoperator input.

Q. The method of one of clauses N-P, wherein determining the cost associated with the vehicle position in the environment based at least on the preferred surface and the adjusted non-preferred surface comprises: determining, for the vehicle position in the environment, a reference distance cost based at least in part on a reference distance of the vehicle position outside a boundary of the preferred surface; and determining, for the vehicle position in the environment, a non-preferred surface distance cost based at least in part on a non-preferred surface distance of the vehicle position to a nearest boundary of the non-preferred surface.

R. The method of one of clauses N-Q, wherein determining the cost associated with the vehicle position in the environment based at least on the preferred surface or the adjusted non-preferred surface further comprises combining the reference distance cost with the non-preferred surface distance cost using a function that includes a first weight for the non-preferred surface distance cost and a second weight for the reference distance cost.

S. The method of one of clauses N-R, wherein the determining, based at least in part on the preferred surface, the adjusted non-preferred surface, and the position of the autonomous vehicle, the cost is based at least in part on a cost entry in a heat map of at least one of the preferred surface and the adjusted non-preferred surface.

T. The method of one of clauses N-S, wherein the determining the cost is further based at least in part on second cost entry in a second heat map associated with a second adjusted non-preferred surface.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

determining a plurality of candidate trajectories for an autonomous vehicle to traverse an environment;

determining, based at least in part on a portion of a route of the autonomous vehicle through of the environment, a non-preferred surface associated with a first portion of the environment which, based at least in part on a policy, is to be avoided by the autonomous vehicle, wherein the non-preferred surface is drivable and unoccupied;

receiving a route reference associated with the portion of the route of the autonomous vehicle through of the environment;

determining, based at least in part on the route reference, a preferred surface associated with a second portion of the environment on which, based at least in part on the policy, the autonomous vehicle is allowed to drive;

determining an adjusted non-preferred surface by removing an overlapping area of the non-preferred surface that overlaps the preferred surface;

determining a cost for a candidate trajectory of the plurality of candidate trajectories based at least on the preferred surface and the adjusted non-preferred surface;

determining a control trajectory for the autonomous vehicle of the plurality of candidate trajectories, based at least in part on the cost; and controlling the autonomous vehicle based at least in part on the control trajectory.

2. The system of claim 1, wherein the non-preferred surface is one or more of:

a bike lane, an oncoming traffic lane, a cross traffic area, a parking area, a high occupancy vehicle lane, a center left turn lane, a time restricted driving lane, an area between separated turning lanes in straight lanes, a junction drivable surface, a bus lane, or a taxi lane.

3. The system of claim 1, wherein the route reference is associated with one or more of:

a traffic lane for traffic traveling in a direction toward a destination of the autonomous vehicle, a parking trajectory, a get on/off road trajectory, or a path associated with teleoperator input.

4. The system of claim 1, wherein determining the cost for the candidate trajectory comprises one or more of:

determining, for a position of the autonomous vehicle in the environment, a reference distance cost based at least in part on a reference distance of the position outside a boundary of the preferred surface, or determining a non-preferred surface distance cost based at least in part on a non-preferred surface distance of the position to a nearest boundary of the non-preferred surface.

5. The system of claim 4, wherein determining the cost for the candidate trajectory comprises combining the reference distance cost with the non-preferred surface distance cost using a function that includes a first weight for the non-preferred surface distance cost and a second weight for the reference distance cost.

6. One or more non-transitory computer-readable media storing instructions executable by one or more processors, wherein the instructions, when executed, cause the one or more processors to perform operations comprising:

determining, based at least in part on a portion of a route of an autonomous vehicle through of an environment, a non-preferred surface associated with a portion of the environment to avoid when driving, wherein the non-preferred surface is drivable and unoccupied;

receiving a route reference associated with the portion of the route of the autonomous vehicle through of the environment;

determining, based at least in part on the route reference, a preferred surface;

determining an adjusted non-preferred surface by removing an overlapping area of the non-preferred surface that overlaps the preferred surface;

determining, based at least in part on the preferred surface, the adjusted non-preferred surface, and a position of the autonomous vehicle, a cost;

determining a control trajectory for the autonomous vehicle based at least in part on the cost associated with the position of the autonomous vehicle; and controlling the autonomous vehicle based at least in part on the control trajectory.

7. The one or more non-transitory computer-readable media of claim 6, wherein the non-preferred surface is one or more of:

a bike lane;

an oncoming traffic lane;

a cross traffic area;

a parking area;

a high occupancy vehicle lane;

a center left turn lane;

a time restricted driving lane;

an area between separated turning lanes in straight lanes;

a junction drivable surface, a bus lane; or a taxi lane.

8. The one or more non-transitory computer-readable media of claim 6, wherein the route reference is associated with one or more of:

one or more traffic lanes for traffic traveling in a direction toward a destination of the autonomous vehicle;

a parking trajectory;

a get on/off road trajectory; or a path associated with a teleoperator input.

9. The one or more non-transitory computer-readable media of claim 6, wherein determining the cost comprises one or more of:

determining, for the position of the autonomous vehicle, a reference distance cost based at least in part on a reference distance of the position of the autonomous vehicle outside a boundary of the preferred surface; or determining, for the position of the autonomous vehicle, a non-preferred surface distance cost based at least in part on a non-preferred surface distance of the position of the autonomous vehicle to a nearest boundary of the non-preferred surface.

10. The one or more non-transitory computer-readable media of claim 9, wherein determining the cost associated with the position of the autonomous vehicle comprises combining the reference distance cost with the non-preferred surface distance cost using a function that includes a first weight for the non-preferred surface distance cost and a second weight for the reference distance cost.

11. The one or more non-transitory computer-readable media of claim 6, wherein the determining the cost is based at least in part on a cost entry in a heat map of at least one of the preferred surface and the adjusted non-preferred surface.

12. The one or more non-transitory computer-readable media of claim 11, wherein the determining the cost is further based at least in part on second cost entry in a second heat map associated with a second adjusted non-preferred surface.

13. A method comprising:

determining, based at least in part on a portion of a route of an autonomous vehicle through of an environment, a non-preferred surface associated with a portion of the environment to avoid when driving, wherein the non-preferred surface is drivable and unoccupied;

receiving a route reference associated with the portion of the route of the autonomous vehicle through of the environment;

determining, based at least in part on the route reference, a preferred surface;

determining an adjusted non-preferred surface by removing an overlapping area of the non-preferred surface that overlaps the preferred surface;

determining, based at least in part on the preferred surface, the adjusted non-preferred surface, and a position of the autonomous vehicle, a cost;

determining a control trajectory for the autonomous vehicle based at least in part on the cost associated with the position of the autonomous vehicle; and controlling the autonomous vehicle based at least in part on the control trajectory.

14. The method of claim 13, wherein the non-preferred surface is one or more of:

a bike lane;

an oncoming traffic lane;

a cross traffic area;

a parking area;

a high occupancy vehicle lane;

a center left turn lane;

a time restricted driving lane;

an area between separated turning lanes in straight lanes;

a junction drivable surface, a bus lane; or a taxi lane.

15. The method of claim 13, wherein the route reference is associated with one or more of:

one or more traffic lanes for traffic traveling in a direction toward a destination of the autonomous vehicle;

a parking trajectory;

a get on/off road trajectory; or a path associated with a teleoperator input.

16. The method of claim 13, wherein determining the cost comprises:

determining, for the position of the autonomous vehicle, a reference distance cost based at least in part on a reference distance of the position of the autonomous vehicle outside a boundary of the preferred surface; and determining, for the position of the autonomous vehicle, a non-preferred surface distance cost based at least in part on a non-preferred surface distance of the position of the autonomous vehicle to a nearest boundary of the non-preferred surface.

17. The method of claim 16, wherein determining the cost further comprises combining the reference distance cost with the non-preferred surface distance cost using a function that includes a first weight for the non-preferred surface distance cost and a second weight for the reference distance cost.

18. The method of claim 13, wherein the determining the cost is based at least in part on a cost entry in a heat map of at least one of the preferred surface and the adjusted non-preferred surface.

19. The method of claim 18, wherein the determining the cost is further based at least in part on second cost entry in a second heat map associated with a second adjusted non-preferred surface.

\*　\*　\*　\*　\*